Figure 3:
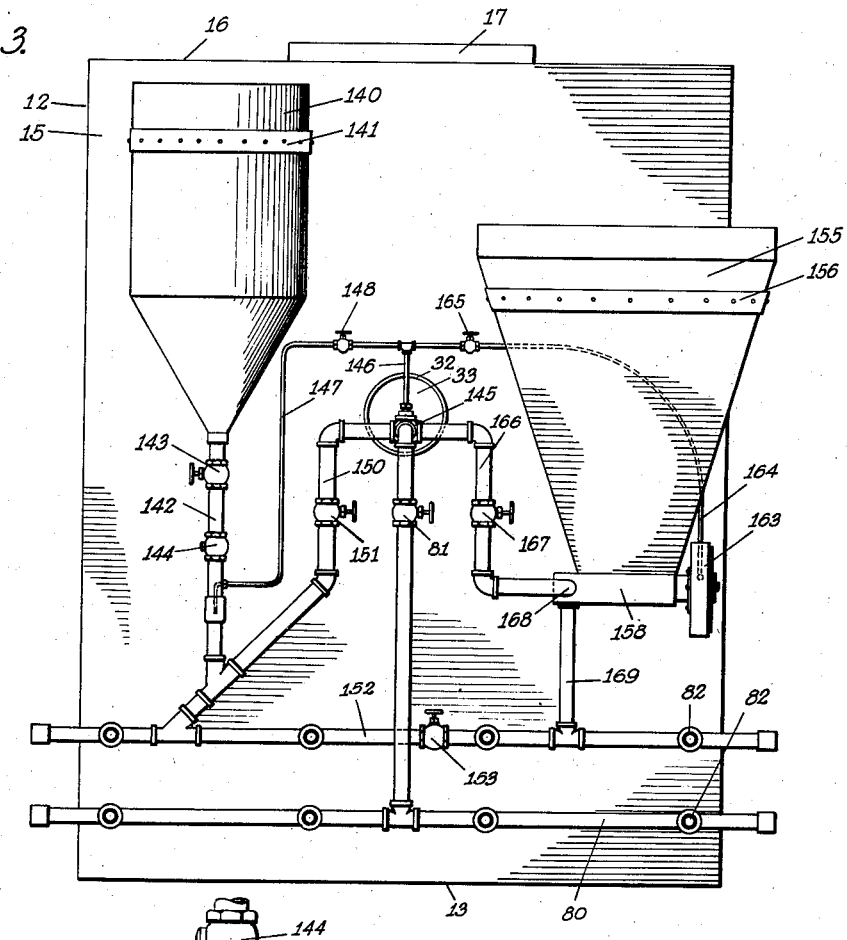

July 11, 1939.  W. R. WERTZ  2,165,321
DEVICE FOR DISSEMINATING BY STEAM AQUEOUS
SOLUTIONS, EMULSIONS AND MIXTURES
Filed May 1, 1935  5 Sheets-Sheet 1
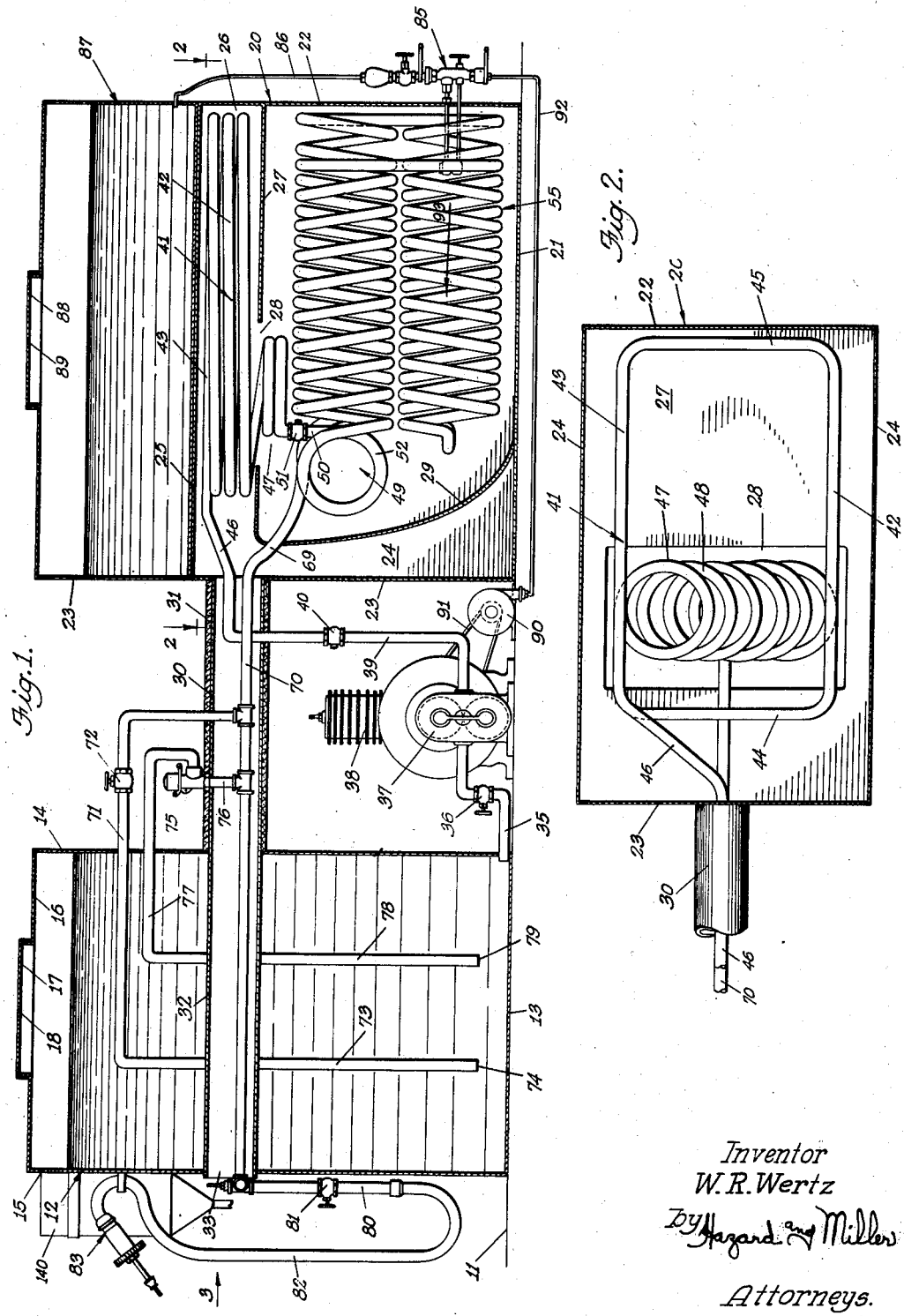
Inventor
W. R. Wertz
by Hazard and Miller
Attorneys.

Inventor
W. R. Wertz
by Hazard and Miller
Attorneys.

Inventor
W. R. Wertz
by Hazard and Miller
Attorneys.

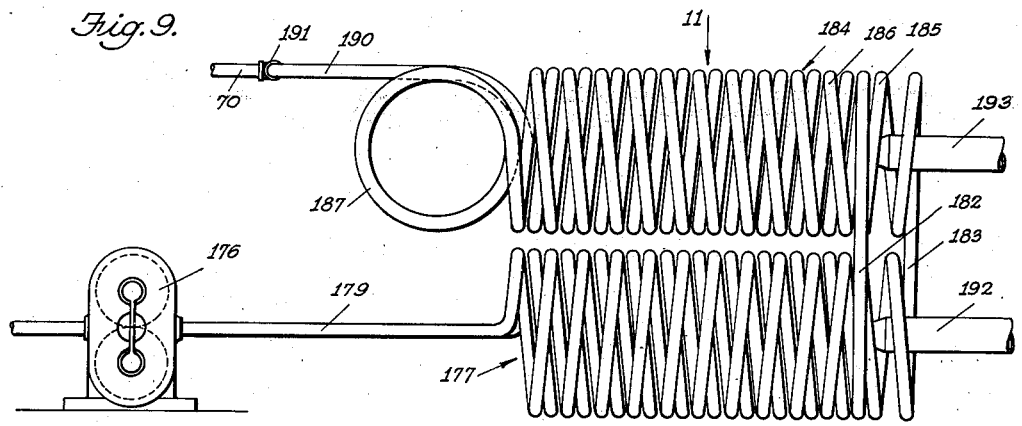
Fig. 9.
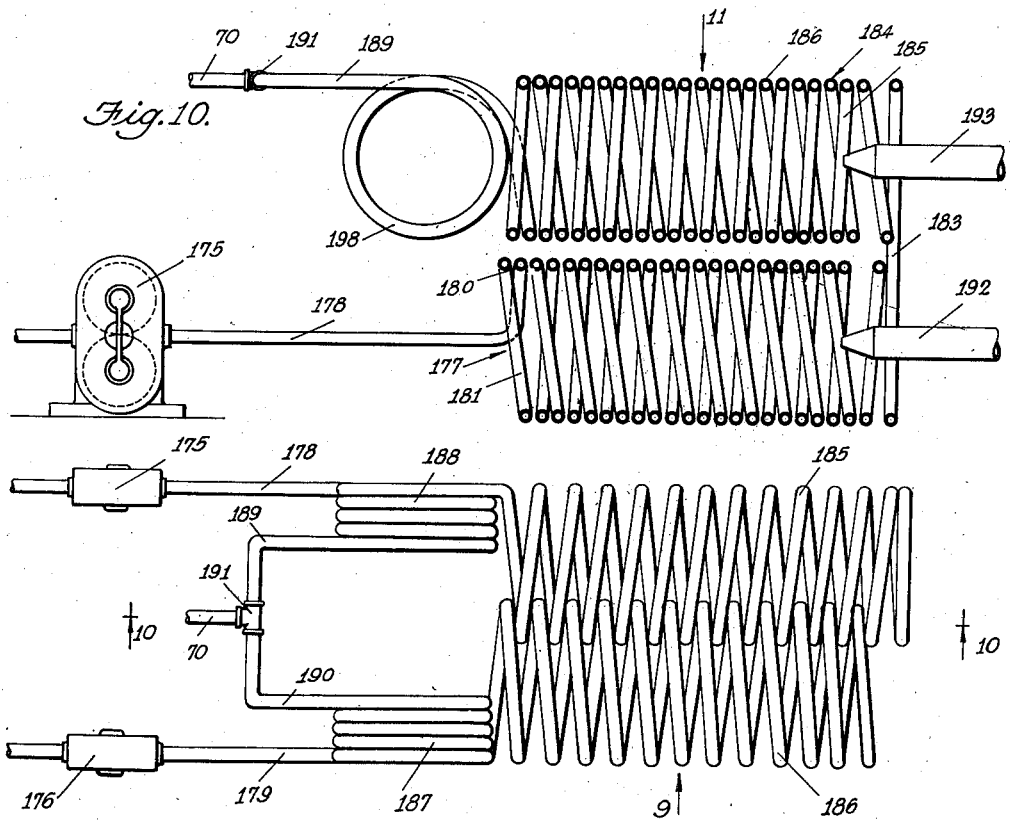
Fig. 10.
Fig. 11.
Inventor
W. R. Wertz
by Hazard and Miller
Attorneys.

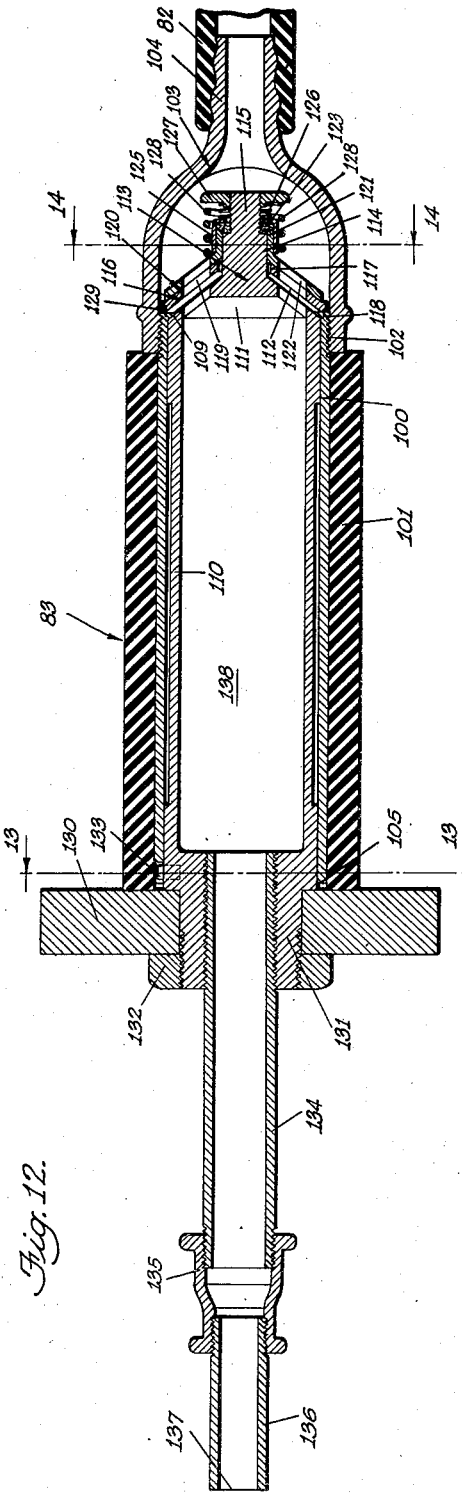

Patented July 11, 1939

2,165,321

UNITED STATES PATENT OFFICE 2,165,321

DEVICE FOR DISSEMINATING BY STEAM AQUEOUS SOLUTIONS, EMULSIONS AND MIXTURES

William R. Wertz, Glendale, Calif.

Application May 1, 1935, Serial No. 19,220

4 Claims. (Cl. 299—87)

My invention relates to an assembly structure employing a steam generator with or without an agitator for the feed water, whereby highly superheated water or steam may be caused to form a projected steam jet on discharge into the atmosphere and thus be used to disseminate various types of aqueous solutions, emulsions or mixtures and the like.

Obviously the steam generator portion of my invention may be utilized for developing steam at comparatively high pressures for various purposes.

My invention also comprehends the use of steam as a carrier or disseminator for various materials, which for instance, may be held in suspension in water, from an emulsion with water, or by mechanical mixtures, and similar purposes. Thus my invention comprehends forcefully projecting these various solutions, emulsions or mixtures, etc., with water in a steam jet and the extremely minute breaking up of the solution, emulsion or mixture.

To more clearly define the objects to be accomplished and the uses of my invention, it may be used as a germicide discharging with steam such materials as aqueous solutions of chlorine, carbon tetra-chloride, carbon bi-sulphide or any soluble or volatile germicide.

My invention may also be used as an insecticide discharging for instance solutions or emulsions such as nicotine sulphate, creosote, oil emulsions, etc., or mixtures such as Paris green, lead arsenite, sulphur, lime, etc. My invention may also be used with detergents as a cleaner using soap solutions, caustic soda, naphtha or other cleaning agents. It may also be used as an equipment for applying such types as paints, water paints, whitewash or liquid stains either of the water or oil carried type.

Thus considered in more detail, various objects and features of my invention comprehend the use of a material supply tank employing an agitator, such agitator being preferably steam developed in the generator. Such steam preheats the feed water supply. The feed water is fed by a positive pressure pump and passed through feed water heating coils preferably heated by the exhaust products of combustion. The type of generator is one having pipe coils preferably of the helical coil type, which may be nested in a particular manner and thus have preheatng coils for the feed water coils subject to a flame or the products of combustion to raise the temperature of the water considerably above the boiling point at atmospheric pressure, and a superheating coil to heat the water to substantially the point of generating steam.

With my invention I preferably use a special type of controllable nozzle by which the superheated water is formed into steam before or at the moment of discharge from the nozzle.

Another feature of my invention resides in the construction of the steam generator and assembly by which the water supply both in the preheating and in the generator for raising to the boiling point, maintains a continuous agitation of the feed water and the material incorporated therein, so that there is no chance for distillation of ingredients incorporated with the water which might distill off at different temperatures from that of the water, and therefore I project in the jet the steam with the various materials in solution, suspension or emulsion or the like, always in the proper proportion.

A further object of my invention resides in the employment of suitable control valves whereby I may discharge with the steam nozzle a very wet or saturated steam, this being such that it is almost immediately deposited by a condensation on vegetation or other structures which are being sprayed. Further, by my control means I may discharge substantially dry steam which forms a rising cloud. This may be used effectively in applying germicides, insecticides, or the like in the treatment of trees or the like, by spraying, in which the cloud of steam rises upwardly from adjacent the ground level through the foliage and the branches of the tree; the major portion of the steam condensing in its upward passage and the remainder of the mixture after condensation forming into globules of sufficient size to drop by gravity again through the foliage of a tree.

A further feature of my invention resides in a steam control together with a steam agitator and safety blowoff into the supply and agitation tank, whereby, although the generator develops steam in a continuous manner by preferably using a constant flame, during the periods in which the steam is not used or projected from the nozzle, it is passed into the agitating supply tank, thus heating the supply water as well as maintaining a violent agitation. Also the safety blowoff steam is likewise blown into the supply agitating tank. Hence none of the ingredients used with the water are lost, but must be discharged through the nozzle. On account of the extraordinarily minute dissemination of the ingredients such as germicides, insecticides, etc., and their conservation, my equipment economizes on some of these expensive products.

Another feature of my invention resides in employing a type of burner with a forced air supply to feed a fuel and this being driven in connection with the feed water pump, whereby should the power source operating the pump fail, the combustion of oil fuel at the burner will immediately stop and thus prevent danger of burning out the pipe coils of the steam generator.

A further object and feature of my invention is using a supply of steam to inject various types of liquid such as germicides or insecticides into a main body of steam or superheated water so that the liquid such as the insecticide or germicide may be discharged from a nozzle with the steam. In this case I use a small jet of steam as an ejector, for the liquid discharging into the main steam connection. This small jet is sufficient to prevent a back flow or blowout through a tank or the like containing the liquid to be discharged with the steam.

Another object and feature of my invention is forcing solid ingredients into the path of the flowing steam or superheated water, which develops steam immediately on release from the nozzle so that such solid materials may be sprayed with the steam and in this connection I provide a feeding means for the dry material of such a character that a packing of the material is maintained adjacent the steam flow pipes so that a blowout of steam through the vessel containing the dry powdered or granular material is prevented. The injection of liquid or powdered or granular material into the flowing steam or superheated water, is to provide a suitable equipment for using liquids or powdered materials which cannot be passed through the agitating tank and through the steam generator.

Another object and feature of my invention is a mounting and assembly of the supply agitator tank, the steam generator, the power units, the burner with its fuel supply and the injector for liquids and dry materials into the steam, whereby the whole assembly may be conveniently moved, for instance in an orchard or other places to be sprayed or treated.

A further object and feature of this assembly is to provide for a separate spraying or application of liquids or solids which may be passed through the supply and agitating tank and the steam generator, or to apply liquids which must be injected into the steam or superheated water and also powdered or granular material to be injected into the steam, or if desirable all three types of materials can be sprayed at the same time.

My invention is illustrated in connection with the accompanying drawings, in which Fig. 1 is a longitudinal section arranged in a more or less diagrammatic way, of my apparatus assembly.

Fig. 2 is a horizontal section on the line 2—2 of Fig. 1, to illustrate the feed water heater.

Fig. 3 is an end elevation taken in the direction of the arrow 3 of Fig. 1, showing the assembly for injecting liquids or pulverized material into the flowing steam or superheated water.

Fig. 4 is a vertical section through the liquid ejector shown in elevation in Fig. 3.

Fig. 5 is a vertical section through the dry powdered material ejector shown in elevation in Fig. 3.

Fig. 6 is a side elevation taken in the direction of the arrow 6 of Fig. 7, of the hot water coils and steam generator coils showing a series connection.

Fig. 7 is a plan of the hot water and steam coils taken in the direction of the arrow 7 of Fig. 6.

Fig. 8 is an end elevation taken in the direction of the arrow 8 of Figs. 6 and 7.

Fig. 9 is an elevation taken in the direction of the arrow 9 of Fig. 11, showing a modified form of coils for the water heater and steam generator, this being a parallel connection suitable for generating a large amount of steam.

Fig. 10 is a longitudinal vertical section on the line 10—10 of Fig. 11 in the direction of the arrows.

Fig. 11 is a plan of the coils taken in the direction of the arrow 11 of Figs. 9 or 10.

Fig. 12 is a longitudinal section of Fig. 13 on the line 12—12 through the control nozzle to regulate the type of steam discharged.

Fig. 13 is a transverse section on the line 13—13 in the direction of the arrows, of Fig. 12.

Fig. 14 is a section on the line 14—14 of Fig. 12 in the direction of the arrows, to illustrate the valve of the nozzle.

Dealing first with the assembly of Figs. 1, 2 and 6 to 8, in this I employ a suitable floor structure 11 which may form part of a truck or other movable vehicle by which my equipment may be moved through an orchard or other places in which spraying or the like by a steam jet is to be used. On this I mount a feed water storage and supply tank 12 which is also the agitating tank. This is shown as having a base 13, end walls 14 and 15, a top 16, a closure cap 17, this latter having an air vent 18.

The steam generator housing 20 is also indicated as mounted on the floor 11. This employs a casing having a bottom 21, a front wall 22, a rear wall 23, side walls 24, a top 25, this forms a housing for the steam generator to be hereunder described in detail.

A preheating chamber 26 is formed below the top 25 and above the partition 27. This latter has an opening 28 for passage of combustion gases, there being a baffle 29 extending from the bottom 21 to the partition 27. An outlet vent pipe for the products of combustion designated 30, has one end secured to the end wall 23 of the steam generator housing and passes through the open space between the steam generator and the supply agitation tank. This section is preferably covered with insulation as indicated at 31. An uncovered section 32 of the flue for waste gases passes through the supply agitation tank, thus forming a heat transfer appliance. The products of combustion which are well cooled are discharged at the open end 33 beyond a wall 15 of the water supply and agitation tank.

The connections for the circulating water and the flow of steam and the agitated liquids may be traced as follows: A water feed pipe 35 is illustrated as connected to the storage and agitation tank 12. This has a control valve 36 and connects to one side of a pressure gear type pump 37. This pump is driven preferably by a small gasoline engine 38 having its own fuel supply tank. The feed water is discharged from the pump under pressure through the supply pipe 39, this pipe passing into the section 30 of the waste gas flue. In this pipe 39 there is a back pressure check valve 40. This pipe is bent into loops forming a feed water preheater designated 41, this being illustrated as having a series of vertical loops, each loop having side pipes 42 and 43 and pipes 44 and 45. These are all located in the chamber 26 between the top 25 and the partition 27. The inlet water pipe is shown as having a diverging portion 46 leading from the flue 30 to the side 43.

Immediately below the preheating coils 41 and substantially at the opening 28 in the partition for the products of combustion there is another set of feed water heating coils 47. These are illustrated as having a series of circular coils indicated at 48 in Fig. 2, such coils overlapping across the opening 28 so that they are thoroughly surrounded by the waste products of combustion. In these coils the plane of the coil is substantially horizontal, thus causing the axis of each coil to be substantially vertical.

The end of the coil 47 is connected to a water preheater 49 by a pipe 50, this having a check valve 51 therein. The preheater 49 is formed of a series of coils 52, each being of a substantially vertical plane so that the axes of these coils is substantially horizontal. These water preheater coils are preferably wound quite tight together.

The steam generator coils designated by the assembly numeral 55 is formed of a series of helical coils of pipe nested together in a manner to maintain the water agitated in passing through the coils requiring a rapid circulation and exposing a large surface to the heating gases.

Figure 6:
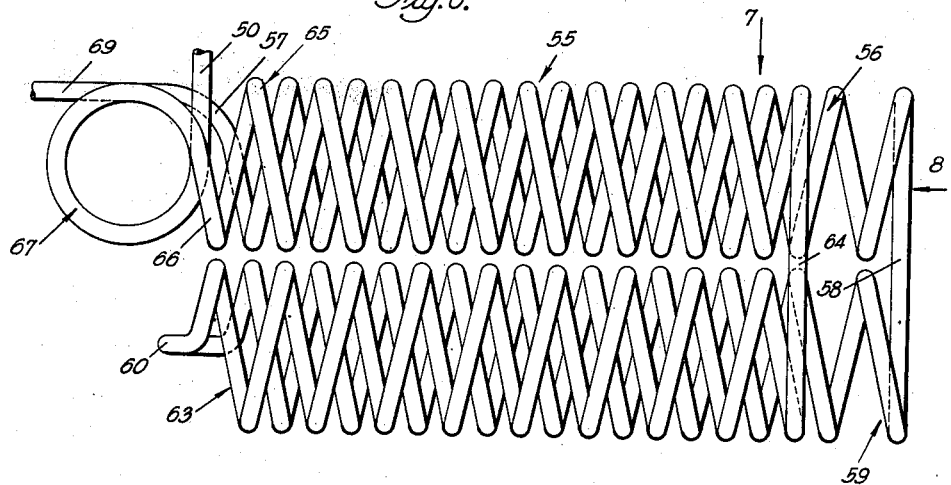
Figure 7:
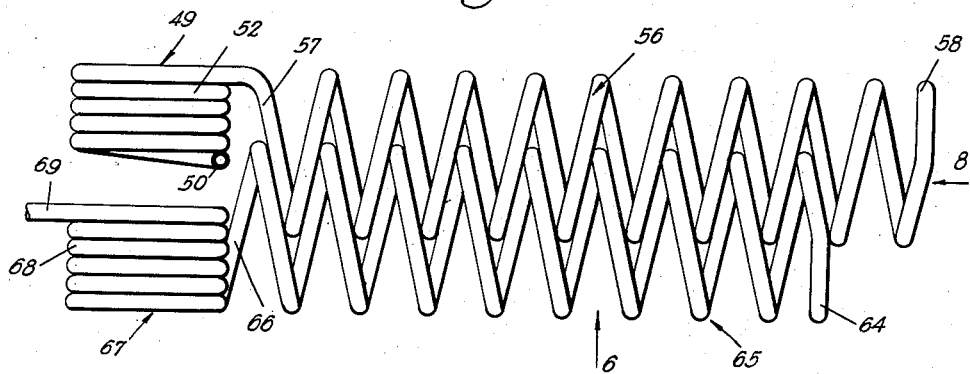
Figure 8:
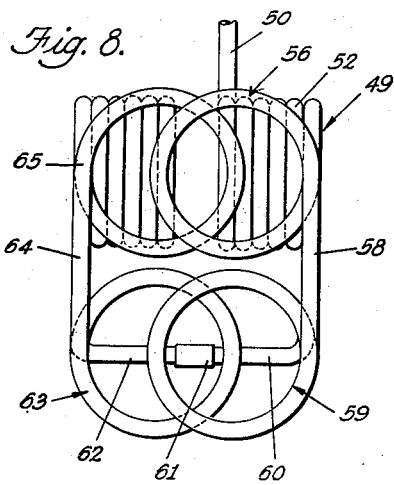

Referring particularly to Figs. 6 and 7, the steam generator has a first set of upper and lateral coils 56, these being helically wound and having a connecting end 57 to the discharge end of the water preheater 49. At the end of the coil 56 there is a vertical pipe 58 which connects to a lower helical coil designated by the assembly numeral 59 (note Fig. 6). This coil terminates in a cross end pipe 60 which is connected by a coupling 61 to another cross end pipe 62 of a second lower helical coil designated 63. The coils 59 and 63 are nested together with a partial overlap in a horizontal direction as shown in Fig. 8. At the end of the coil 63 there is an upwardly extending connecting pipe 64 from which is developed a second upper and laterally displaced helical coil 65. The upper coils 56 and 65 are nested as shown in Figs. 7 and 8, these being the upper coils overlapping in a horizontal direction. The coil 65 has an end section 66 which leads to a steam superheater 67 or in some cases this functions as a water superheater to increase the temperature of the water above the boiling point in atmosphere. A coil 67 has a series of loops 68 packed close together and having a transverse horizontal axis. The steam outlet pipe 69 leads from the superheater coil 67. It has a section passing through the baffle 29 of Fig. 1 and connects to a longitudinal steam pipe 70 which extends through the flue 30 and the section of the flue 32. By having this superheating water or steam pipe 70 in this flue, it is not necessary to heat insulate such pipe.

The water in the supply and agitation tank 12 is maintained in an agitated condition by having a steam takeoff pipe 71 connected to the pipe 70, the connection being illustrated in section 30 of the flue, the pipe 70 passing outwardly through this flue and into an upper portion of the tank 12 and in this pipe 71 there is a control valve 72. A downwardly extending end 73 of the steam agitation pipe is led towards the bottom 13 of the tank 12 and has an open discharge end 74 to project steam or the superheated water downwardly into the tank 12. This flow of steam or hot water not only agitates the water in the tank which may contain material in solution, an emulsion or material in suspension, but heats the supply feed water.

In addition I provide a safety steam blowoff valve 75 which is connected in a pipe 76, this leading from the steam or hot water pipe 70. This safety valve is of a standard type, but instead of blowing off the steam to atmosphere, the blowoff steam is passed by a pipe 77 leading into the storage tank and having a downwardly turned end 78 and an open discharge end 79. Thus when the pressure in the steam generator and the pipe 70 reaches the steam blowoff pressure, this steam is blown into the supply tank 12 and condensed therein. Therefore the various ingredients incorporated with the water are not lost but conserved and the blowoff steam also functions to heat the supply water.

The steam for purposes of utility as in use in a spray, is conducted from the pipe 70 to a manifold 80, this having a control valve 81 and from this manifold there may be one or more flexible hose connections 82, each hose having a shutoff type of discharge nozzle valve 83, this latter being described in detail hereinunder.

The burner assembly designated generally by the assembly numeral 85 may employ a standard type of oil burner which is fed by a supply pipe 86 leading from a liquid fuel tank 87. For convenience this tank is located on top of the housing or casing enclosing the steam generator coils and the preheater coils in order to obtain a gravity flow of the oil fuel. A closure cap 88 is fitted on the fuel tank and is provided with a vent opening 89. I prefer to employ a type of liquid fuel burner which requires a supply of air to inject the fuel. This air is pumped by an air blower 90 which is illustrated as driven by a belt 91 from the gasoline engine 38 and hence is driven in connection with the drive of the pump 37. An air pipe 92 leads from the air blower 90 to the fuel burner. This fuel burner is positioned to project a jet of flame in the direction of the arrow 93, this being centrally located in regard to the overlapped lower coils 59 and 63 so that a large surface of these pipes is exposed to the direct action of the burner flame and the hot products of combustion.

These products of combustion as well as a portion of the flame impinge on the upper set of nested coils 56 and 65 and where they are directed upwardly by the baffle 29, impinge on the coils of the water heater 49 and the steam superheater 67. The hot products of combustion pass through the opening 28 in the partition 27 and come in contact with the feed water heater coils 48 adjacent this opening and also surround the water heater coil pipes 41 in the chamber 26. The waste gases from the products of combustion pass to atmosphere through the vent flue having the pipe sections 30 and 32 and are discharged at 33 into the atmosphere.

With this construction and setup, should for any reason the gasoline engine fail and thus the pump 37 fail to pump the water supply, the air blower 90 is stopped at the same time. This causes an extinguishing of the oil fuel burner. Hence, when the water supply is cut off, there is no danger of burning or melting the water and steam coils of the steam generator.

The nozzle valve designated generally by the numeral 83 and shown in Figs. 12, 13 and 14, is constructed as follows: This employs a tubular sleeve 100 to which is secured on the outside a rubber or other insulating hand grip 101. The sleeve has an externally threaded connection 102 with a reducing end 103, this latter having a connecting neck 104 to the flexible hose 82. The sleeve 100 terminates at 105 and adjacent its end has a cutout notch 106 terminating in shoulders 107 and 108 (note Fig. 13). The sleeve at the threaded end 102 has an inwardly coned inturned rim 109 forming a stop shoulder.

Rotatably mounted inside of the sleeve 100 there is a valve cylinder 110 which has a spider construction 111 at one end, this spider having an externally cone-shaped surface 112 engaging the shoulder 109. The spider has openings for the flow of liquid. Centrically connected to the spider there is a stem 113 which has a squared exterior section 114 and a reduced threaded end 115, a stationary cone valve seat 116 has a circular inner periphery 117 fitting around the squared section of the stem and has a peripheral portion 118 resting on the outside of the shouldered end 109 of the sleeve 100. This valve seat has ports 119.

A movable cone valve element or disk 120 has a squared neck 121 fitting on the squared section of the stem. This is provided with ports 122 to register with the ports 119. A resilient packing washer 123 is fitted on the screw threaded section of the stem and bears against the end of the neck 112. A metal cup 125 is fitted over the washer and also the exterior of the neck 121 and is held in place by a spring 126 which engages the base of the cup and also a nut 127 threaded on the threaded end 115 of the stem. This gives a resilient pressure on the packing washer and prevents leakage between the neck 121 and the squared stem. A compression spring 128 bears against the nut 127 and the exterior cone portion of the cone disk 120, causing a closure surface contact between the stationary disk 116 and the movable disk 120, both of which have ports for alignment. The stationary disk is held from rotation preferably by a pin 129 engaging with the end of the sleeve 100.

To rotate the valve cylinder 100, this is provided with a hand grip disk 130 which fits in the hub section 131 at the end of the cylinder 110 and is jammed in place by a nut 132 threaded on the hub. A pin 133 is secured to the hub and operates in the cutout slot 106 in the sleeve 100 between the stop shoulders 107 and 108. The rotation between these two shoulders is sufficient to fully open or close the valve, that is, to align the ports 119 and 122 or to bring these out of alignment. A short nozzle pipe 134 is secured to the hub 131 and has a reducing coupling 135 attached thereto to which coupling is connected a discharge nozzle 136, having an orifice 137. By this construction it will be seen that the hand grip covering 101 may be held stationary as to the hand so that there is no twist to the hose 82, then by rotating the hand grip disk 130, the valve cylinder may be rotated to control the opening of the valve. In this construction a large chamber 138 is formed inside of the valve cylinder 110 which affords a sufficient space for the thorough mixing of either the superheated water or steam which passes through the valve disks before there is a discharge through the nozzle pipe and the orifice.

The manner of operation and functioning of my invention so far described, is as follows: The water supply tank 12 is filled to the desired capacity with water and the ingredient or material to be used therewith if a spraying operation is to be performed. This ingredient may be something which forms a solution with the water or may form an emulsion or merely a material which forms a mixture in suspension. I find that by using a gear type pump 37 I may use quite a large proportion of solid material to mix and hold in suspension in the water, provided such material does not have a gritty or abrading characteristic which may otherwise destroy the pump. In the first operation the feed water valve 36 is opened, the steam agitator valve 72 is also opened but the valve 81 leading to the hose 82 or the nozzle valve 83, is closed. Then when the pump is started a circulation of water is developed past the various check valves, through the water preheater and the coils of the generator. It is preferable to continue this pumping action for a short time as the water drawn from the tank 12 recirculates through the pipe 71 and agitates the mixture in the spray tank 12. When this is properly agitated the burner may be ignited and as above mentioned it is preferable to supply the burner with air by a blower 99 driven by the same engine which actuates the pump; this air being usually for the purpose of injecting the oil fuel. The flame and the products of combustion heat the water and bring this to a temperature above the boiling point and on account of having so many coils in the generator and in the preheating and superheating coils, the water with the ingredients therein are maintained agitated so that there can be no separation. This is necessary as some of the materials used with water distill at a lower temperature than the boiling point of water and they would be apt to separate under the action of heat.

As the temperature of the liquid circulating through the generator increases, it forms steam when discharged through the pipe 73 into the tank 12. This steam gives a more efficient agitation than the flow of the liquid itself and also functions to heat the water supply in the tank 12. When the generator is operating as desired, the valves 36 and 72 may be controlled to either feed a large volume of water in a definite time, or restrict this, and moreover, by restricting the valve 72 the quantity of steam discharged into the supply tank 12 is restricted, but its pressure and temperature increased. When a sufficient amount of steam is being generated the steam valve 81 may be opened in the manifold 80 then the nozzle valve 83 may be actuated and directed to spray the steam wherever desired.

A characteristic of my invention is that the feed supply water, the supply of agitating steam and the regulation of the valve 81 and nozzle valve 83 may be such that either a very wet spray of steam is obtained or by restricting the flow of water, a dry steam may be developed. In both cases, it is desirable to operate the apparatus so that the pipe 70 conveys superheated water instead of steam. Then this water is at such a temperature that when relieved of pressure at the orifice 137, where it is discharged into atmosphere, the hot water immediately forms a cloud of steam which as above mentioned may be highly or quite dry. In this procedure, as the water in the tank 12 is at atmospheric pressure, the hot water discharged from the pipe 73, practically developes steam in such pipe so that the liquid in the tank 12 is agitated by steam.

Different types of spray are suitable for different purposes. The wet steam sprayed causes an almost immediate condensation wherever the spray or jet impinges without forming very much of a steam cloud. This may be used for spraying vegetation, the trunks of trees, for disinfecting, applying a paint material or the like. Where it is desired to spray the foliage of trees, a dry steam jet may be formed in which case when the steam jet is discharged underneath the foliage, a cloud of warm steam rises and a considerable portion of such steam is condensed on the leaves, buds, branches etc. of the tree. As the steam condenses in the air, it forms small globules which if there is but little wind, drop by gravity through the foliage of the tree, a large proportion being collected on the tree instead of descending to the ground.

Figure 4:
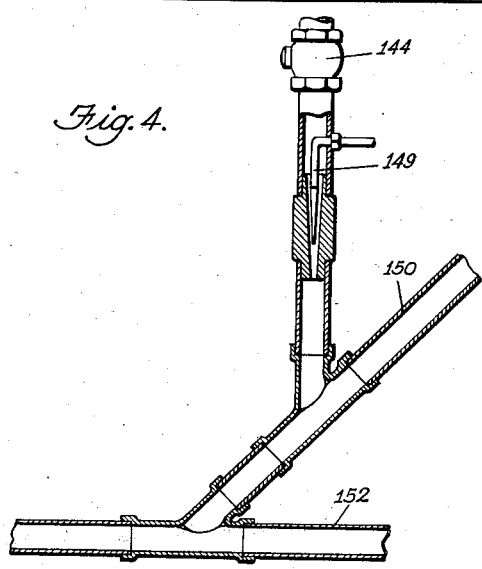
Figure 5:
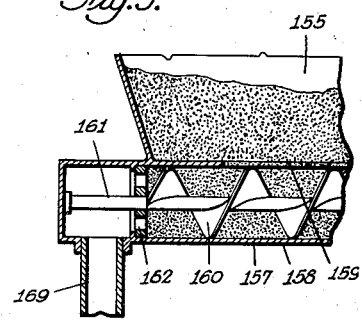

In Figs. 3, 4 and 5, I show the assembly for ejecting a liquid and a powdered material into the steam or superheated water before the steam is discharged through the nozzle. In this construction I illustrate a liquid supply tank 140 which may be secured by a suitable bracket 141 to the end wall 15 of the water supply tank 12 which latter also functions as the agitation tank. From the tank 140 there is a liquid discharge pipe 142 having a control valve 143 and also being provided with a check valve 144. The main steam supply pipe 70 is provided with a fitting 145 from which there is connected a small injector steam pipe 146, this leading to a pipe 147, there being a valve 148 in the connection. This pipe 147 has an injector 149 located in the pipe 142 and discharging into the steam or hot water pipe 150 which is illustrated as connected to the fitting 145 and this steam pipe having a valve 151 therein. The steam pipe 150 connects to a manifold 152 from which there are a plurality of flexible hose connections 82. There is preferably a control valve 153 in the manifold so that it may be divided into two parts.

A dry material hopper 155 is also secured by a bracket 156 to the front wall 15 of the combination supply and agitation tank 12. At the bottom of this hopper there is a material feeding device 157. This employs a somewhat cylindrical casing 158 having an opening 159 to the hopper and a screw 160 mounted on a screw shaft 161. A perforated plate 162 is located at the end of the casing 158. The screw is rotated by a small steam turbine 163 which derives its steam supply from a steam pipe 164 having a control valve 165 therein, this being connected to the small steam pipe 146 or in other manner leads from the main steam pipe 70. A supply of steam or superheated water to carry the granular material is by means of a steam pipe 166 illustrated as connected to the fitting 145 and having a control valve 167 therein. This leads to one side of the casing 158 as indicated at 168, this being on the discharge side of the perforated plate 162. The steam which carries the powdered material is then discharged downwardly through a pipe 169 to the manifold 152 and is thence discharged through a flexible hose 82 and the nozzle. As above mentioned the valve 153 permits dividing the manifold 152 into two parts. By this construction the steam turbine is so operated as to back the powdered material in the casing 158 against the perforated plate 162 and to expel such material through this plate. Therefore the steam pressure from the steam generator transmitted through the pipe 166 cannot cause a back flow through the case 158 and the dry material hopper 155. Manifestly the rate of operation of the turbine 163 and thus the screw feed of the dry material may be regulated by the steam valve 165.

In Figs. 9, 10 and 11 I illustrate in a more or less diagrammatic form a parallel connection of the steam generating coil. In this case I preferably use two pumps indicated at 175 and 176 which supply feed water to the lower set of nested coils 177; this being by means of the water pipes 178 and 179, these being connected to the coils as indicated at 180 and to the end coil 181. These coils have vertical connecting pipes 182 and 183 leading to a double upper set of coils 184. These have two distinct coils 185 and 186 nested together. Each of these has a superheater coil 187 and 188 and the superheater coils are preferably arranged with their axes horizontal and thus located across the open space of the upper set of coils 184. Each superheater coil has its own discharge pipe 189 and 190, which pipes by means of a coupling 191 connect to a steam pipe 70 where this type of steam generator in parallel is used instead of the series generator of Figs. 6, 7 and 8.

In this construction there are illustrated two burners 192 and 193, each discharging centrally through the upper and lower sets of coils. Thus as the lower sets of coils 177 are for the feed water, this water is heated, the flame passing up to the superheater coils 187 and 188. The upper burner increases the temperature of the water as it flows in the coils from the end adjacent the burner towards the superheater coils. Therefore these upper coils 184 function more as the coils for the generation of steam. The superheater coils 187 and 188 are in the direct path of the flame from the upper burner 193 and the flame from this burner impinges directly on the superheater coils; thus either superheating the water to a temperature considerably above the boiling point at atmospheric pressure or forming a dry steam, this being dependent on the rate at which the steam is being used. With the parallel connection of Figs. 9 through 11 of the generator coils, a greater quantity of steam can be developed in a given time.

A characteristic feature of the steam generator and arrangement of the coils is that the water with the material to be disseminated in the steam is maintained in an agitated condition due to the swirling of the water and then of the steam in the coils. The axis of the water heater coils 49 and the steam superheater coils 69 of Figs. 6, 7 and 8, is transverse to the axis of the main coils of the steam generator. The main coils of the steam generator are formed of the two lateral upper and lower coils. These coils are formed to have a reverse twist or helical turn as viewed from the ends and depending on the manner in which the coils of the steam generator are connected to the water heater coils 49 and the superheater coils 67, the water and steam may be considered as turning in a clockwise or counter-clockwise direction of rotation and this direction of rotation may reverse where the water or steam flows from one helical coil to another helical coil. Moreover, at the opposite ends of the coils where one coil is connected to another, the flow of water or steam is changed from a helical flow to either a straight or an angular flow at the connecting pipes from one coil to the other. This maintains the turbulence of the water or steam and the material to be disseminated with the steam.

Another feature of my invention in having the sets of helical coils interfitted in an overlapping manner as shown in Figs. 7 and 8, is that it is impossible to nest the coils so closely together that the two sets of coils have their loops in alignment, but the loops must be offset more or less one to the other as shown in Figs.

7 and 8. This construction presents a large area of the pipes of coils to the flame from the burner and hence gives a large heating surface exposed both to the direct jet of the flame from the burner and the hot products of combustion.

With my type of steam generator having the coils with reverse direction of winding as viewed from either end, even though materials such as oils may be used with water, which would evaporate or gassify at a different temperature from that of the water, nevertheless the water and the liquids incorporated therein are maintained in such a state of agitation and intimate mixture, that they both practically gassify at the same time and the gas or vapor of the oils or similar liquids and of the water are carried through the remaining portion of the coils and the steam superheater as an intimate mixture of steam with the liquid material to be disseminated therewith.

It is to be understood that in the practice of my invention, it is not necessary to develop the steam in the steam generator, the superheater coils, the pipes connected thereto or prior to discharge from the nozzle, but I may for certain purposes perform what I term a superheating of the water. This is heating the water to such a temperature preferably above the boiling point at atmospheric pressure, whereby a jet of superheated water is discharged from the nozzle. This jet of hot water is at such a temperature and is forced out at such a high velocity that the jet of water carries a considerable distance from the nozzle and then rapidly expands, forming a wet aqueous vapor, a portion of which condenses into visible steam. This manner of using my invention is of particular advantage where it is desired to apply a very wet coating of material to be disseminated on foliage or the like; for instance, in spraying trees. The superheated water carrying the material to be disseminated is thus projected as much as several feet from the nozzle and then expands rapidly in a cloud of very wet vapor and saturated steam. Of course, in this procedure a certain amount of steam is developed as the jet travels through the air prior to its vaporization.

Various changes may be made in the details of construction without departing from the spirit or scope of the invention as defined by the appended claims.

I claim:

1. In a device as described, the combination of a steam generator for generating steam from water, an outfeed pipe for the steam from the generator, a hopper for dry powdered material, a feeding device therefor to discharge small quantities of the material at a time, a casing into which material is discharged, a steam pipe communicating from the outfeed pipe through the casing to a nozzle whereby the dry powdered ingredients become incorporated and mixed with the steam prior to the steam and ingredients reaching the nozzle, the feeding device having means to pack the powdered material to prevent a back blow of steam through the hopper.

2. In a device as described, the combination of a steam generator having a plurality of coils of pipe, each arranged in a helical coil, certain of the coils being nested together, the ends of the coils being connected together to give a continuous flow of water and steam, the axes of the coils being horizontal, a burner positioned to discharge a flame in a longitudinal direction of the coils, a coil forming a superheater at the end remote from the burner, a horizontal set of feed water coils located above the generator coils, a waste gas flue connected at one end of the feed water heater coils, whereby the waste gases after impinging on the feed water coils pass through the flue, a feed water tank, the flue passing through said tank, a steam pipe in the flue, a steam pipe connection from the steam pipe to the feed water tank and discharging adjacent the bottom thereof to agitate the feed water and the materials incorporated therein for dissemination with the steam, a pump forming a positive feed for the feed water from the feed water tank to the water heater coils, a manifold connected to the end of the steam pipe and a controllable nozzle connected to the manifold, a second manifold connected to the steam pipe, an injector for liquids having a steam jet connection for injecting liquids to be disseminated into the second manifold, and a second steam connection to the second manifold having means for discharging dry material into the second steam connection and nozzles connected to the second manifold.

3. In a device as described, a feed water supply tank, means to agitate the water to maintain ingredients incorporated therein in the tank whether liquid or solid, intimately mixed with the water, a steam generator, a pump connecting the supply tank to the generator, the generator having a series of connected pipes forming a tortuous path with a multiplicity of turns and reverse turns, a back flow check valve between two reverse turn portions of the pipes, means to heat the generator whereby as the water and the ingredients are heated they are maintained in an intimately mixed and agitated condition, a discharge flue for the products of combustion leading through the supply tank, an outfeed pipe from the steam generator extending through said flue and a discharge nozzle connected to the outfeed pipe, a steam take-off pipe from the outfeed pipe having a valve and an outlet in the supply tank, an additional blow-off pipe connected to the outfeed pipe having a safety valve and also a connection to the supply tank whereby under all conditions of generation of steam, steam with ingredients mixed therewith are returned to the tank through the take-off pipe and under conditions of excess pressure, steam with the mixed ingredients are returned through the blow-off pipe to the supply tank or to the blow-off valve, the steam take-off pipe and the blow-off pipe forming the means to agitate the water and the ingredients in the supply tank.

4. In a device as described, a feed water supply tank, a steam generator, a pump to pump from the supply tank to the generator, the generator having a series of connected pipes forming a tortuous path with a multiplicity of turns and reverse turns, a back flow check valve located between two reverse portions of the pipes, means to heat the pipes of the generator to highly heat the water, an outfeed pipe from the steam generator having a discharge nozzle connected thereto, a steam take-off pipe from the outfeed pipe leading to the supply tank and adapted to discharge steam or hot water from the outfeed pipe to the supply tank, such discharge forming a means for agitating ingredients whether liquid or fine solids to be disseminated with the steam in the feed water to obtain an intimate mixture, the tortuous path of the pipes of the steam generator being adapted to maintain the water and the ingredients thoroughly mixed and to prevent a differential vaporization of water and a liquid incorporated therewith or separation of water and fine solids, a blow-off pipe connected to the outfeed pipe and discharging in the water supply tank and adapted to provide an additional means for agitating the water and the ingredients in the supply tank and also adapted to form a return flow from the generator to the supply tank should the pressure in the feed pipe become excessive.

WILLIAM R. WERTZ.